(12) United States Patent
Champ et al.

(10) Patent No.: US 8,960,800 B2
(45) Date of Patent: Feb. 24, 2015

(54) FOLD AND TUMBLE RELEASE MECHANISM

(71) Applicants: William D. Champ, Mount Clemens, MI (US); Rabindranath Persad, Superior Township, MI (US); Jeffrey P. Carroll, West Bloomfield, MI (US)

(72) Inventors: William D. Champ, Mount Clemens, MI (US); Rabindranath Persad, Superior Township, MI (US); Selvakumaresan Veluswamy, Farmington Hills, MI (US); Jeffrey P. Carroll, West Bloomfield, MI (US)

(73) Assignee: Magna Seating Inc., Newmarket, Ontario (CA)

( * ) Notice: Subject to any disclaimer, the term of this patent is extended or adjusted under 35 U.S.C. 154(b) by 198 days.

(21) Appl. No.: 13/684,179

(22) Filed: Nov. 22, 2012

(65) Prior Publication Data

US 2013/0147249 A1    Jun. 13, 2013

Related U.S. Application Data

(60) Provisional application No. 61/562,632, filed on Nov. 22, 2011.

(51) Int. Cl.
| | |
|---|---|
| *B60N 2/20* | (2006.01) |
| *B60N 2/30* | (2006.01) |
| *B60N 2/015* | (2006.01) |
| *B60N 2/235* | (2006.01) |
| *B60N 2/44* | (2006.01) |

(52) U.S. Cl.
CPC .......... *B60N 2/3011* (2013.01); *B60N 2/01583* (2013.01); *B60N 2/206* (2013.01); *B60N 2/235* (2013.01); *B60N 2/305* (2013.01); *B60N 2002/445* (2013.01); *B60N 2002/4465* (2013.01)
USPC ..................... 297/378.1; 296/65.09

(58) Field of Classification Search
CPC ........ B60N 2/3011; B60N 2/305; B60N 2/20; B60N 2/206; B60N 2002/445
USPC ........... 297/378.1, 378.12, 378.14; 296/65.09
See application file for complete search history.

(56) References Cited

U.S. PATENT DOCUMENTS

| | | | |
|---|---|---|---|
| 6,793,285 B1* | 9/2004 | Tame | 297/336 |
| 6,910,739 B2* | 6/2005 | Grable et al. | 297/378.12 |
| 7,021,716 B2 | 4/2006 | Persad et al. | |
| 7,152,922 B2 | 12/2006 | Garland | |
| 7,293,838 B2 | 11/2007 | Sugama et al. | |
| 7,871,127 B2 | 1/2011 | Bruck et al. | |
| 8,360,528 B2* | 1/2013 | Shinohara | 297/378.12 |

(Continued)

*Primary Examiner* — Sarah B McPartlin
(74) *Attorney, Agent, or Firm* — Miller Canfield

(57) ABSTRACT

A release mechanism selectively actuates a recliner between a locked condition and an unlocked condition allowing pivotal movement of a seat back between a seating and fold flat position. The release mechanism includes a recliner cam lever operatively coupled to the recliner for actuating the recliner between the locked and unlocked conditions. A recliner handle lever engages the recliner cam lever in a first actuated position to actuate the recliner between the locked and unlocked conditions allowing pivotal movement of the seat back between a seating position and a fold flat position and further engages the recliner cam lever in a second actuated position to release a seat cushion from the floor and allow pivotal movement of the seat cushion between a seating position and tumbled position when the seat back is maintained in the fold flat position.

11 Claims, 10 Drawing Sheets

(56) References Cited

U.S. PATENT DOCUMENTS

| | | |
|---|---|---|
| 2010/0109411 A1 | 5/2010 | Shinohara |
| 2011/0049925 A1 | 3/2011 | Champ |
| 2011/0084533 A1* | 4/2011 | Bruck et al. ............. 297/367 R |
| 2011/0127822 A1 | 6/2011 | Moegling et al. |

* cited by examiner

FOLD AND TUMBLE RELEASE MECHANISM

RELATED APPLICATIONS

This application claims priority to and all the benefits of U.S. Provisional Application No. 61/562,632, filed Nov. 22, 2011, and entitled "Fold and Tumble Release Mechanism".

BACKGROUND OF THE INVENTION

1. Field of the Invention

The present invention relates to a fold and tumble release mechanism for a vehicle seat assembly of an automotive vehicle. More particularly, the invention relates to a release mechanism coupled between a seat back and seat cushion to provide selective pivotal movement of the seat back between an upright seating position and a fold flat position overlying the seat cushion.

2. Description of Related Art

Automotive vehicles typically include one or more seat assemblies having a seat cushion and a seat back for supporting a passenger above a vehicle floor. The seat assembly is commonly mounted to the vehicle floor by a riser assembly. The seat back is typically operatively coupled to the seat cushion by a recliner assembly for providing selective pivotal adjustment of the seat back relative to the seat cushion.

It is commonly known to provide seat assemblies in the $2^{nd}$ or $3^{rd}$ row of the vehicle seating compartment. The front portion of seat assembly is commonly pivotally coupled to the vehicle floor and the rear portion releasably latched to the vehicle floor to allow the seat assembly to pivot forwardly to a tumbled position to allow access behind the seat assembly. A release mechanism is generally coupled to the recliner assembly for selectively actuating the recliner assembly to allow pivotal movement of the seat back between the seating and fold flat position and also selectively actuate a latch mechanism coupling the seat assembly to the vehicle floor to allow pivotal movement to the tumbled position. However, current release mechanisms typically include multiple release handles and actuating lever for actuating each of the recliner and latch mechanism to facilitate positioning of the seat assembly in the folded and tumbled positions.

It is desirable, therefore, to provide a release mechanism wherein actuation of a single lever facilitates positioning of the seat assembly in each of the folded and tumbled positions.

SUMMARY OF THE INVENTION

According to one aspect of the invention, a seat assembly for use in an automotive vehicle is provided comprising a seat cushion adapted to be releasably and pivotally coupled to the floor of the vehicle for selective pivotal movement between a generally horizontal seating position and an upright tumbled position. A seat back is pivotally coupled to the seat cushion by a recliner mechanism for providing pivotal movement between an upright seating position and a fold flat position overlying the seat cushion. A release mechanism selectively actuates the recliner mechanism between a locked condition and an unlocked condition allowing pivotal movement of the seat back between the seating and fold flat positions. The release mechanism includes a recliner cam lever operatively coupled to the recliner mechanism for actuating the recliner mechanism between the locked and unlocked conditions. A recliner handle lever is pivotally coupled to the seat cushion and engages the recliner cam lever in a first actuated position to actuate the recliner mechanism between the locked and unlocked conditions and allow pivotal movement of the seat back between the seating position and the fold flat position and further engages the recliner cam lever in a second actuated position to release the seat cushion from the floor and allow pivotal movement of the seat cushion between the seating position and the tumbled position when the seat back is maintained in the fold flat position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
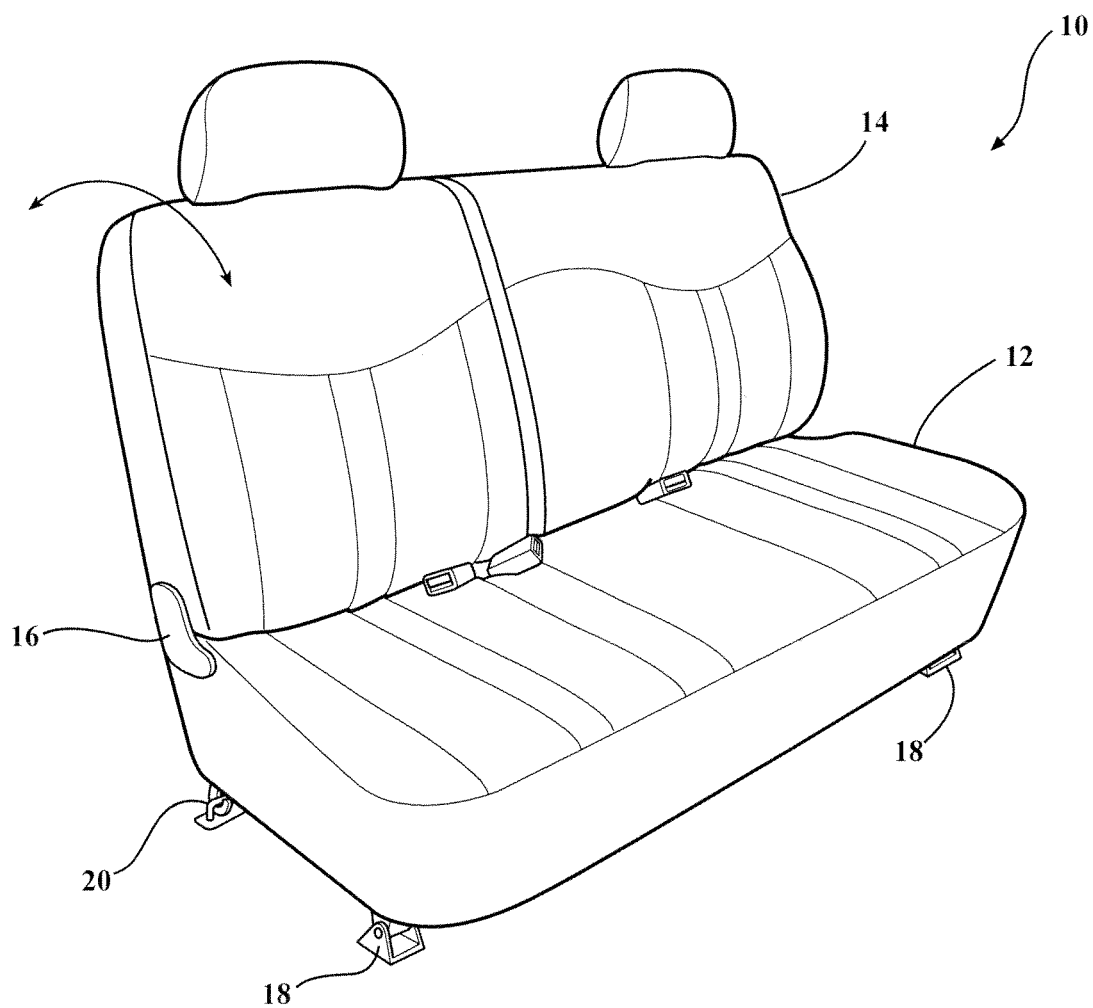
FIG. 1 is a perspective view of a seat assembly for an automotive vehicle.

Referring to the Figures, wherein like numerals indicate like or corresponding parts throughout the several views, a seat assembly for use in an automotive vehicle is generally shown at 10 and includes a generally horizontal seat cushion 12 and a generally upright seat back 16 for supporting a seat occupant as is commonly known in the art. The seat back 14 is operatively coupled to the seat cushion 12 by a recliner assembly 16 for providing pivotal movement between an upright seating position, a plurality of reclined seating positions, and a fold flat position overlying the seat cushion 12 as is commonly known in the art. The recliner assembly 16 in the preferred embodiment is a disc-type recliner. A front portion of the seat cushion 12 is pivotally coupled to the vehicle floor by front pivot risers 18 and a rear portion is releasably coupled to the floor by a latch mechanism 20, such as a hook latch for engaging a striker bar, as is also commonly known in the art. When the seat back 14 is in the fold flat position, the latch mechanism 20 may be actuated to release the rear portion of the seat cushion 12 from the floor and allow pivotal movement of the seat assembly 10 about the front pivot risers to an upright tumbled position allowing access behind the seat assembly 10 as is commonly known in the art.

Figure 2:
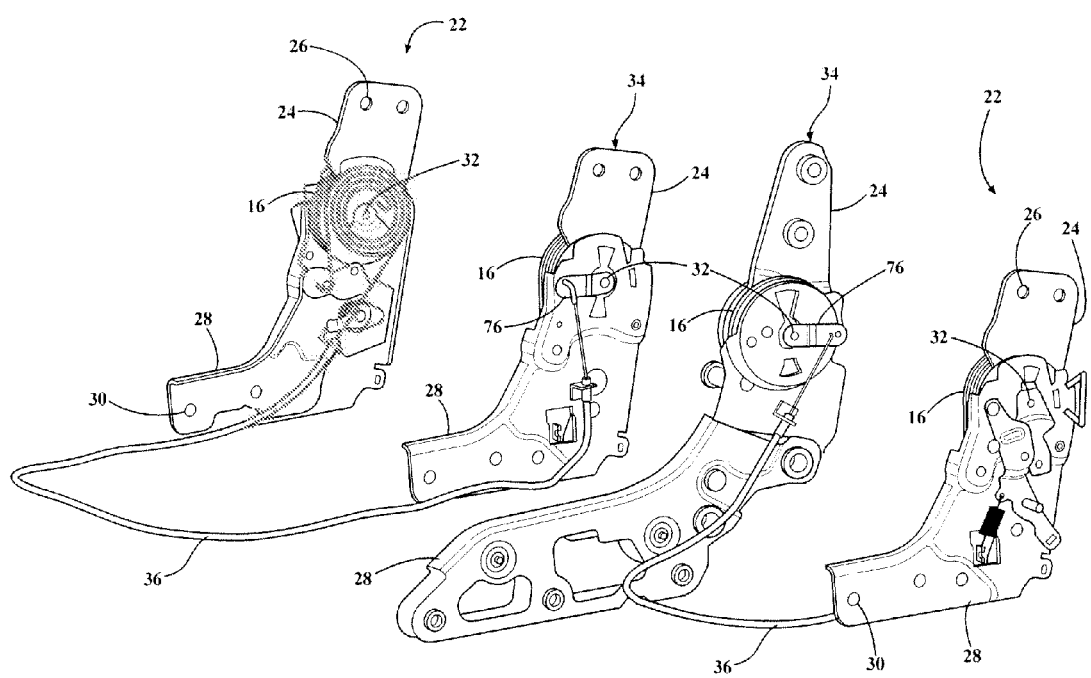
FIG. 2 is a perspective view of a pair of fold and tumble release mechanisms according to one embodiment of the invention.

Referring to FIG. 2, the present invention relates to a fold and tumble release mechanism 22 operatively coupled between the seat cushion 12 and seat back 14 for facilitating actuation of the seat assembly 10 between the seating, fold flat, and tumbled positions. FIG. 2 discloses a pair of release mechanism 22 such as for a 60-40 split type seat assembly used in the vehicle $2^{nd}$ row wherein each portion of the seat assembly operates independently via its respectively release mechanism 22. The release mechanism 22 includes a seat back bracket 24 having a first distal end 26 adapted to be fixedly secured to the seat back 14 and a seat cushion bracket 28 having a first distal end 30 adapted to be fixedly secured to the seat cushion 12. The opposite ends of the seat back bracket 24 and seat cushion bracket 28 are pivotally coupled via the disc recliner 16 wherein the disc recliner 16 allows selectively pivotal movement of the seat back bracket 24 (and hence seat back 14) relative to the seat cushion bracket (and seat cushion 12). The disc recliner 16 includes an axial drive shaft 32 for actuating the disc recliner between a locked condition preventing pivotal movement between the seat back 14 and seat cushion 12 and an unlocked condition allowed pivotal movement therebetween. Each seat assembly 10 includes an outboard release mechanism 22 and a similar inboard release mechanism 34. However, the inboard release mechanism 34 only requires a disc recliner 16 operatively coupled between the seat back bracket 24 and seat cushion bracket 28 wherein the inboard release mechanism 34 in synchronized with the actuation of the outboard release mechanism 22 via a push-pull cable 36 coupled therebetween.

Figure 3:
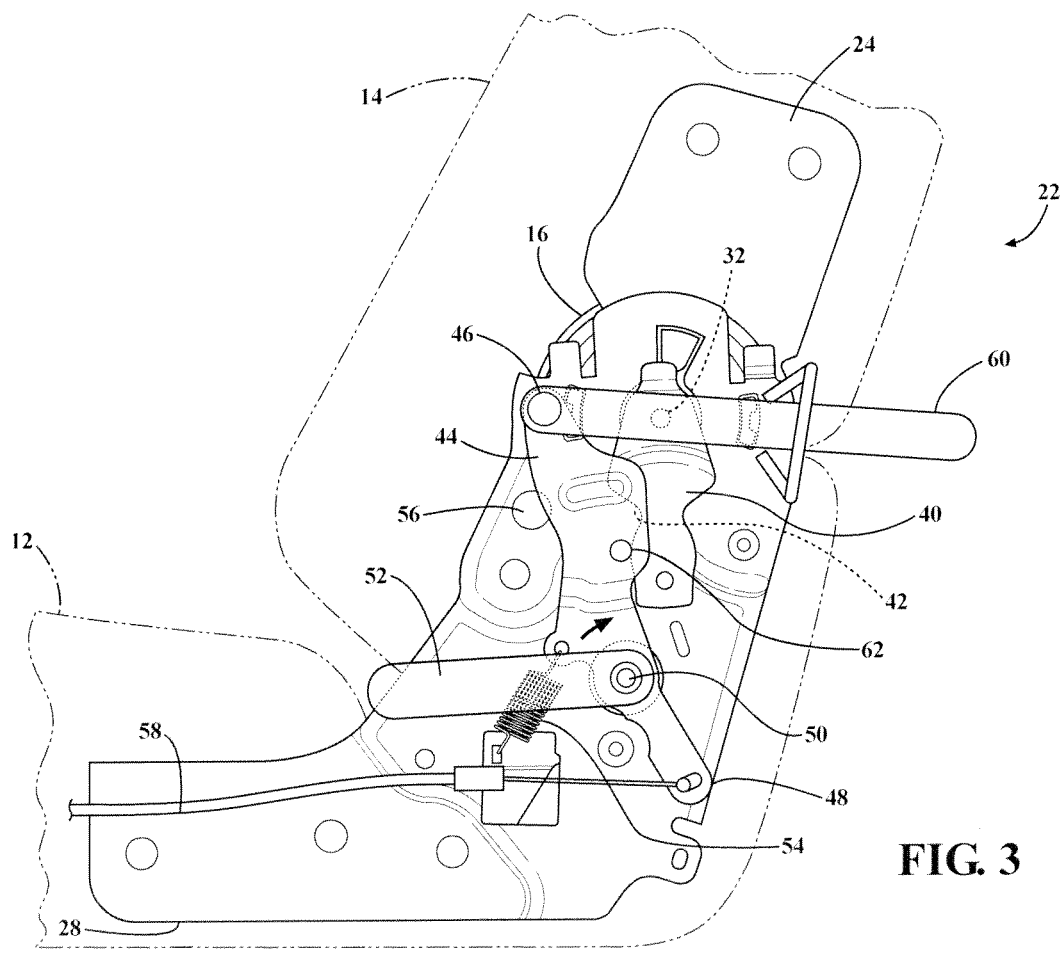
FIG. 3 is an outboard side view of the fold and tumble release mechanism.

Referring to FIG. 3, the outboard side of the fold and tumble release mechanism 22 is shown with the seat assembly 10 in the upright seating position. The release mechanism 22 further includes a recliner cam lever 40 having a first end fixedly secured to the end of the drive shaft 32 for actuating the recliner 16 between the locked and unlocked conditions and an opposite second end. A forward edge of the recliner cam lever 40 forms a curved cam surface 42 extending between the first and second ends thereof. The release mechanism 22 also includes a recliner handle lever 44 extending between a first upper end 46 and opposite second lower end 48. The recliner handle lever 44 is pivotally coupled to the seat cushion bracket 28 via a rotatable shaft 50 midway between the upper and lower ends 46, 48. A recliner handle 52 is fixedly secured about the shaft 50 and projects forwardly therefrom for pivoting the recliner handle lever 44 in the clockwise direction. A return coil spring 54 extends between the seat cushion bracket 28 and the recliner handle lever 44 above the shaft 50 for returning and biasing the recliner handle lever 44 in the counterclockwise direction. A stop pin 56 projecting laterally from the seat cushion bracket 28 abuts the forward edge of the recliner handle lever 44 to limit counterclockwise rotation and define a neutral position. A secondary power actuator pull cable 58 is connected to the lower end 48 of the recliner handle lever 44 for alternatively pivoting the recliner handle lever 44 in the clockwise direction. Further, a third row pull strap 60 is connected to the upper end 46 of the recliner handle lever 44 for alternatively pivoting the recliner handle lever 44 in the clockwise direction. A pin 62 projects laterally inwardly from the recliner handle lever 44 adjacent the rearward edge thereof for engaging the recliner cam lever 40 and following the cam surface 42 during actuation of the recliner 16 between the locked and unlocked conditions.

Figure 4:
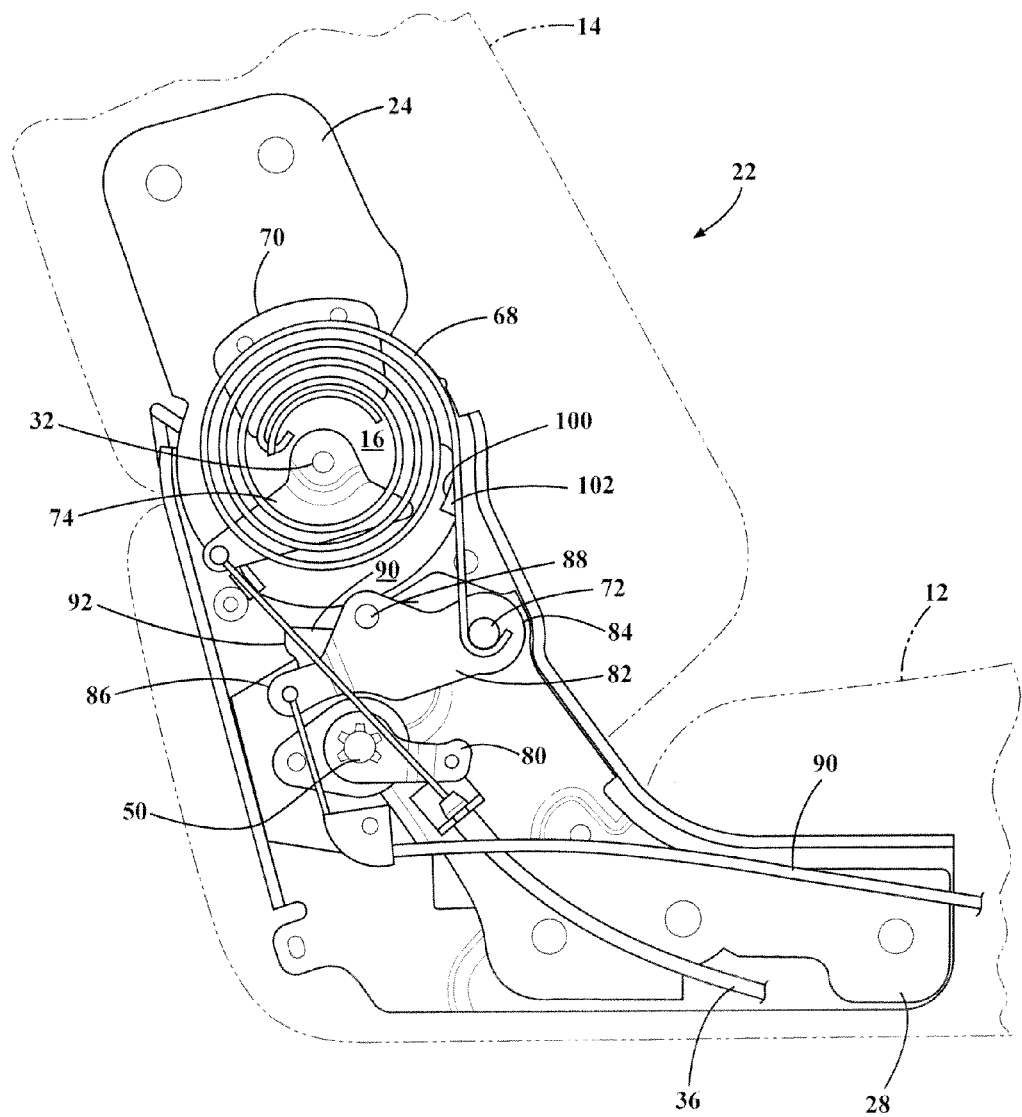
FIG. 4 is an inboard side view of the fold and tumble release mechanism.

Referring to FIG. 4, the inboard side of the fold and tumble release mechanism 22 is shown with the seat assembly 10 in the upright seating position. The release mechanism 22 further includes a clock spring 68 having a first end secured to a bracket 70 attached to the seat back bracket 24 and an opposite second end secured to a pivot post 72 projecting from the seat cushion bracket 28. The clock spring 68 biases the seat back 14 in the upright seating position and assist in returning the seat back 14 from the fold flat position to the seating position as is commonly known in the art. A recliner release lever 74 is fixedly secured to the distal end of the recliner drive shaft 32 for rotation therewith. Referring back to FIG. 2, the sync or cross talk cable 36 extends from the recliner release lever 74 to a lever 76 on the drive shaft 32 of the opposite side recliner 16 for synchronizing actuation of the recliners 16 between the locked and unlocked conditions. The release mechanism 22 also includes an inboard cam lever 80 fixedly secured to the shaft 50 for rotation therewith. A floor latch release lever 82 includes a first end 84 pivotally coupled to the pivot post 72 and an opposite distal second end 86. A blocking pin 88 projects laterally from the floor latch release lever 82 for engaging the bottom of the seat back bracket 24 in the seating position preventing pivotal movement of the floor latch release lever 82. A floor latch release cable 90 extends from the distal second end 86 of the floor latch release lever 82 to the floor latch mechanism 20 for actuating and unlocking the floor latch mechanism 20 from the vehicle floor upon pivotal movement of the floor latch release lever 82. The release mechanism 22 further includes a latch interlock lever 92 having a first end pivotally coupled to the pivot post 72 and an opposite distal second end 94 for selectively engaging a portion of the seat back bracket 24 as will be described below.

The seat back bracket 22 includes a notch 100 in the forward edge portion terminating in an end wall 102 for engagement with the distal second end 94 of the latch interlock lever 92 when the seat back 14 is in the fold flat position and the floor latch mechanism is released from the vehicle floor.

Figure 5:
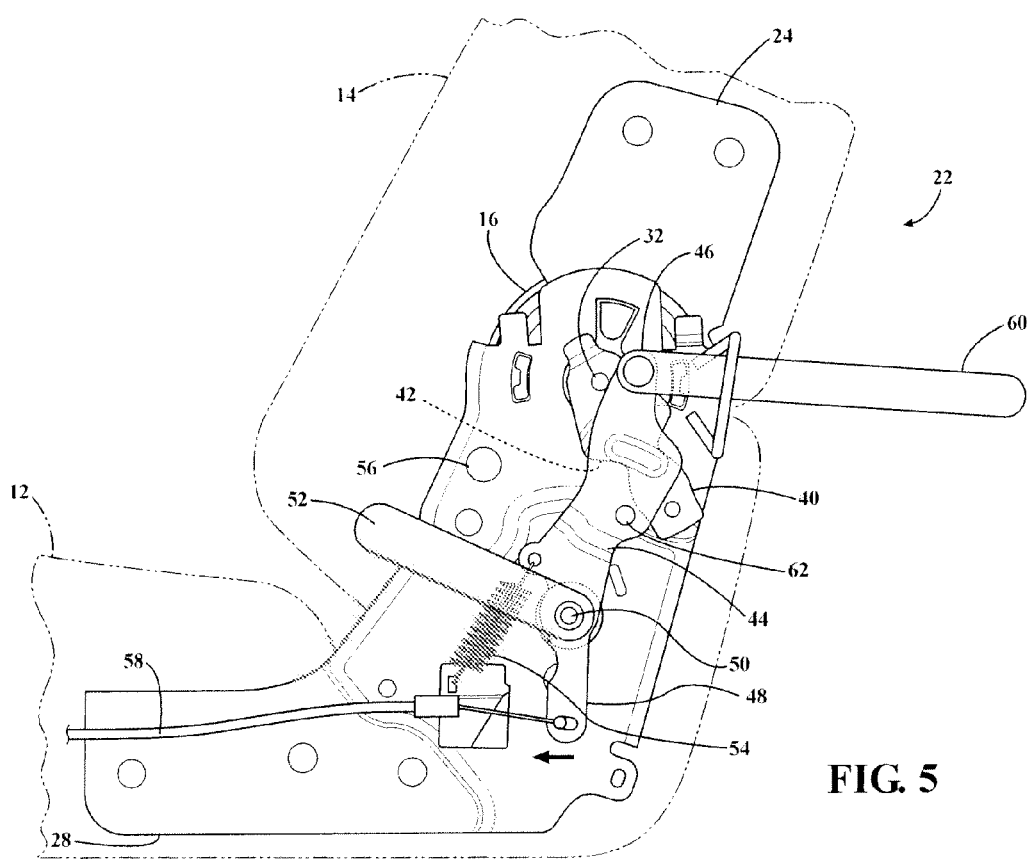
FIG. 5 is an outboard side view of the fold and tumble release mechanism with a recliner handle lever in a first actuated position unlocking the recliner assembly.
Figure 6:
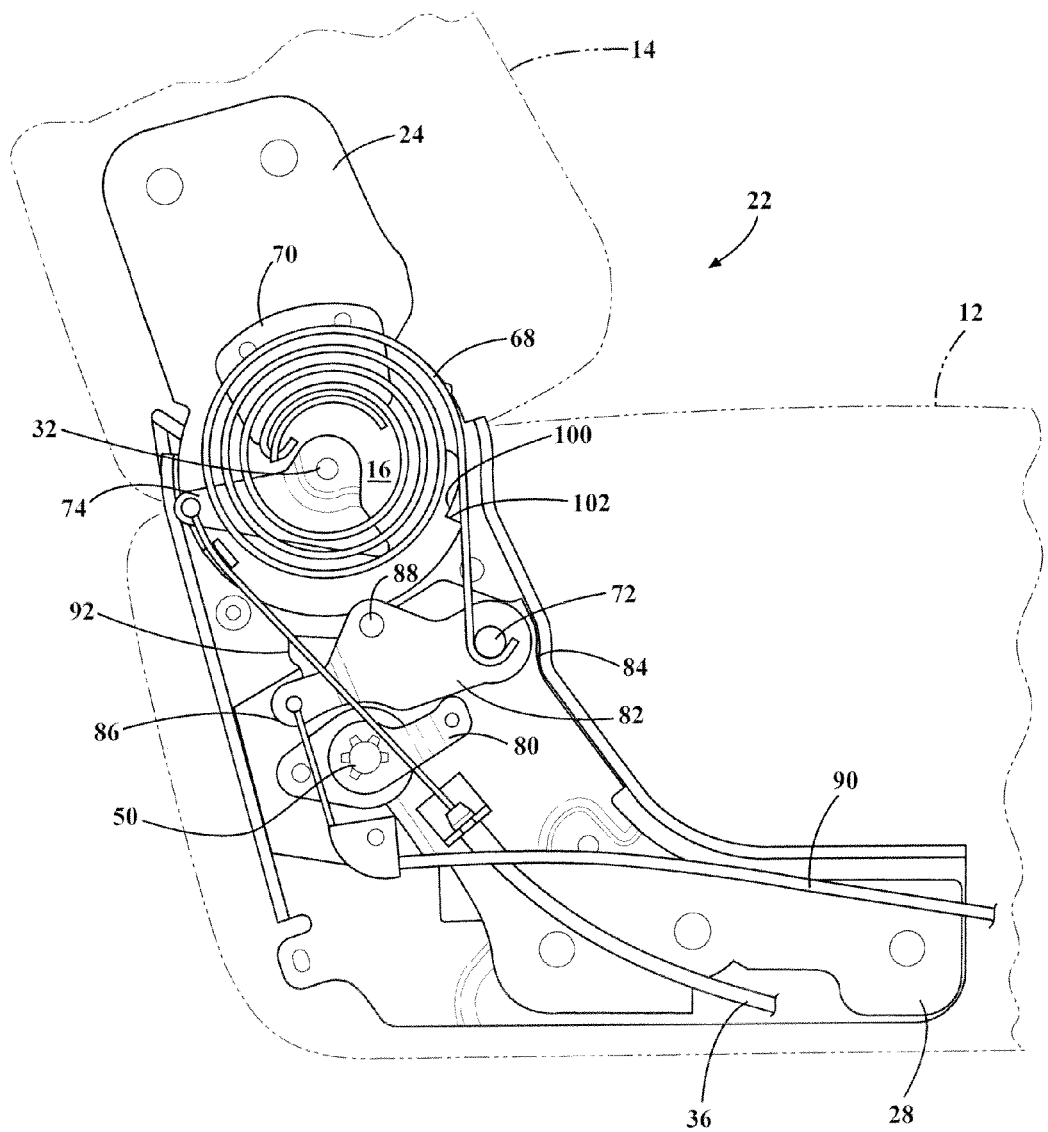
FIG. 6 is an inboard side view of the fold and tumble release mechanism with the recliner handle lever in the first actuated position.

In operation, referring to FIG. 5, one of the recliner 52, power actuator pull cable 58, or third row pull strap 60 is pulled to pivot the recliner handle lever 44 clockwise about the axis of the shaft 50 to a first actuated position rotated approximate 33 degrees. The pin 62 engages the cam surface 42 on the recliner cam lever 40 to rotate the recliner cam lever 40 in the counterclockwise direction while sliding along the cam surface 42 to actuate the recliner 16 from the locked to unlocked condition. With the recliner 16 in the unlocked condition, the seat back 14 is free to pivot relative to the seat cushion 12 between the upright seating position, a plurality of rearward recline positions, or the forwardly fold flat position overlying the seat cushion 12. As the recliner handle lever 44 rotates to the first actuated position, with the seat back 14 still in the seating position, the inboard cam lever 80 also pivots with the shaft 50 in the upward or counterclockwise direction as shown in FIG. 6. The inboard cam lever 80 engages the floor latch release lever 82, however, the blocking pin 88 on the floor latch release lever 82 abuts against the bottom edge of the seat back bracket 22 prevent further rotation of the recliner handle lever 44 and inboard cam lever 80. Therefore, the floor latch release lever 82 cannot pull the floor latch release cable 90 to release the floor latch mechanism 20 while the seat back 14 is in the upright seating position.

Figure 7:
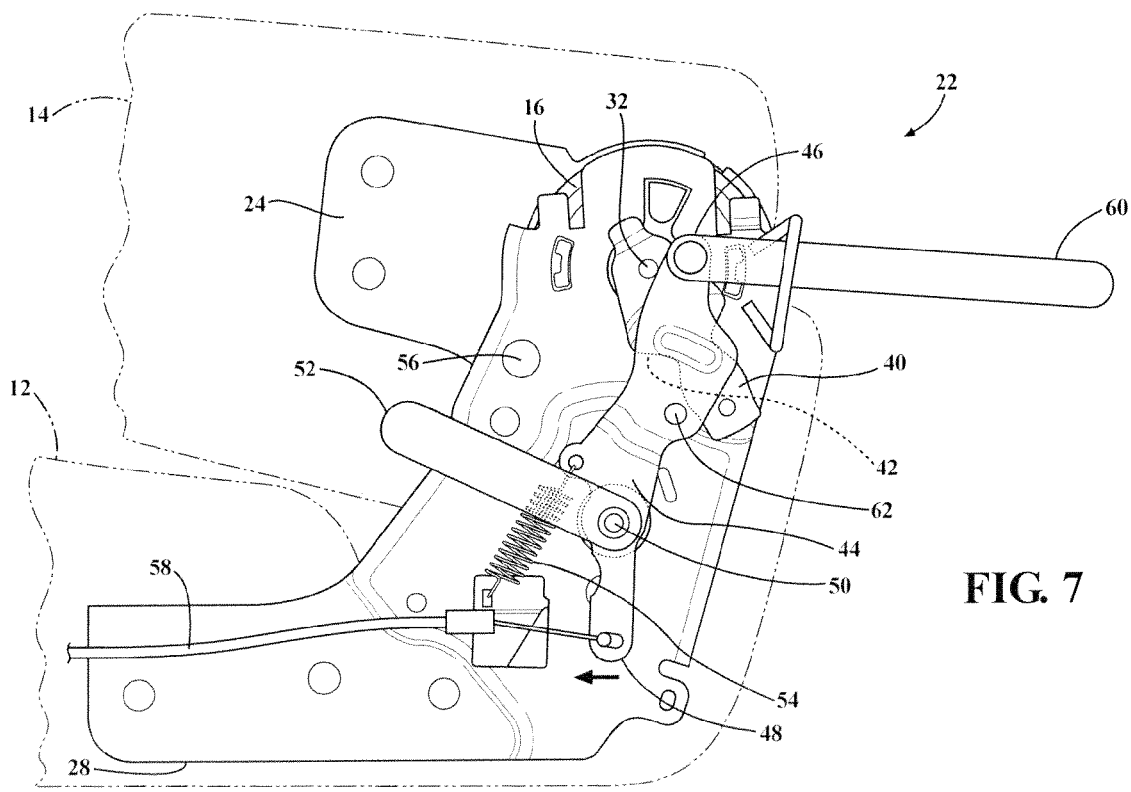
FIG. 7 is an outboard side view of the seat assembly with the seat back in the fold flat position.
Figure 8:
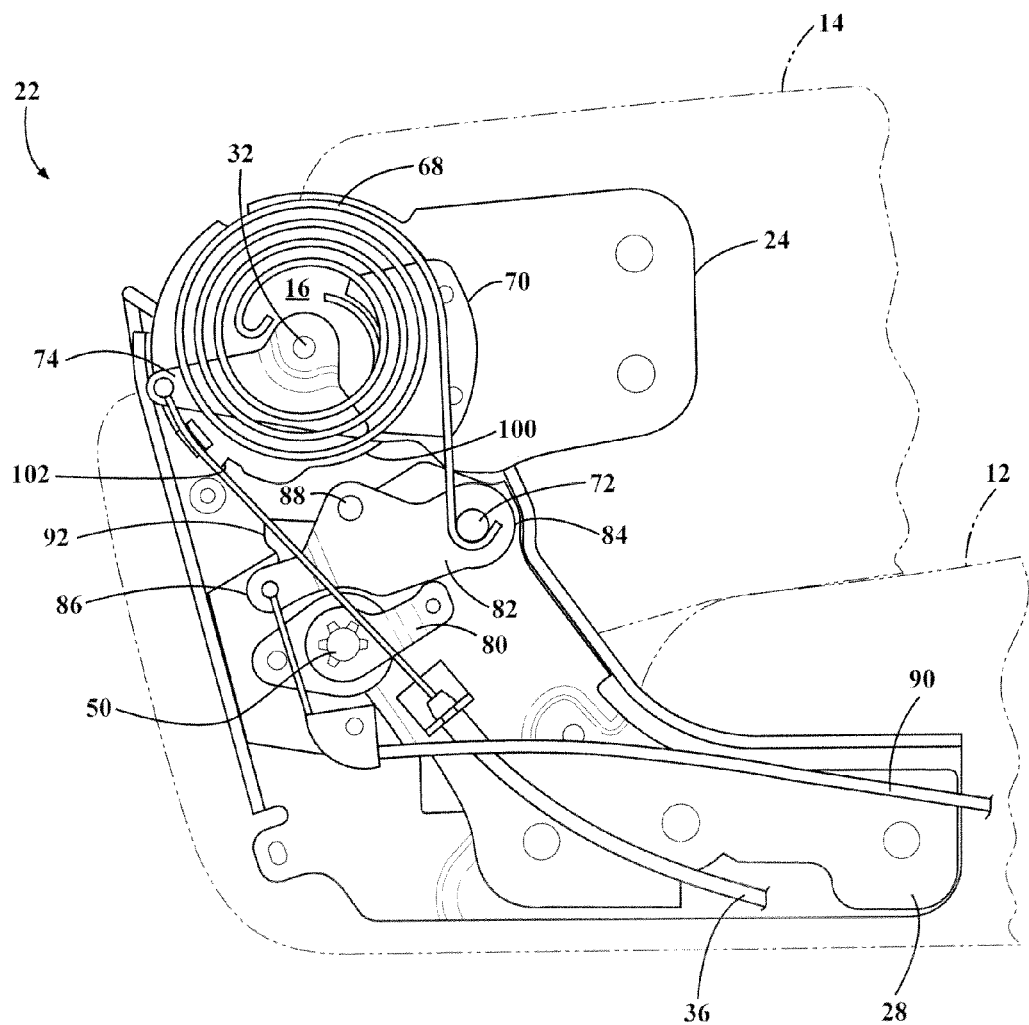
FIG. 8 is an inboard side view of the seat assembly with the seat back in the fold flat position.

Referring to FIGS. 7 and 8, with the recliner handle lever 44 in the first actuated position, the seat back 14 may be pivoted forwardly to the fold flat position overlying the seat cushion 12. With the seat back 14 in the fold flat position, the notch 100 in the seat back bracket 24 is positioned above the blocking pin 88 of the floor latch release lever 82 to allow clearance for pivotal movement of the floor latch release lever 82.

Figure 9:
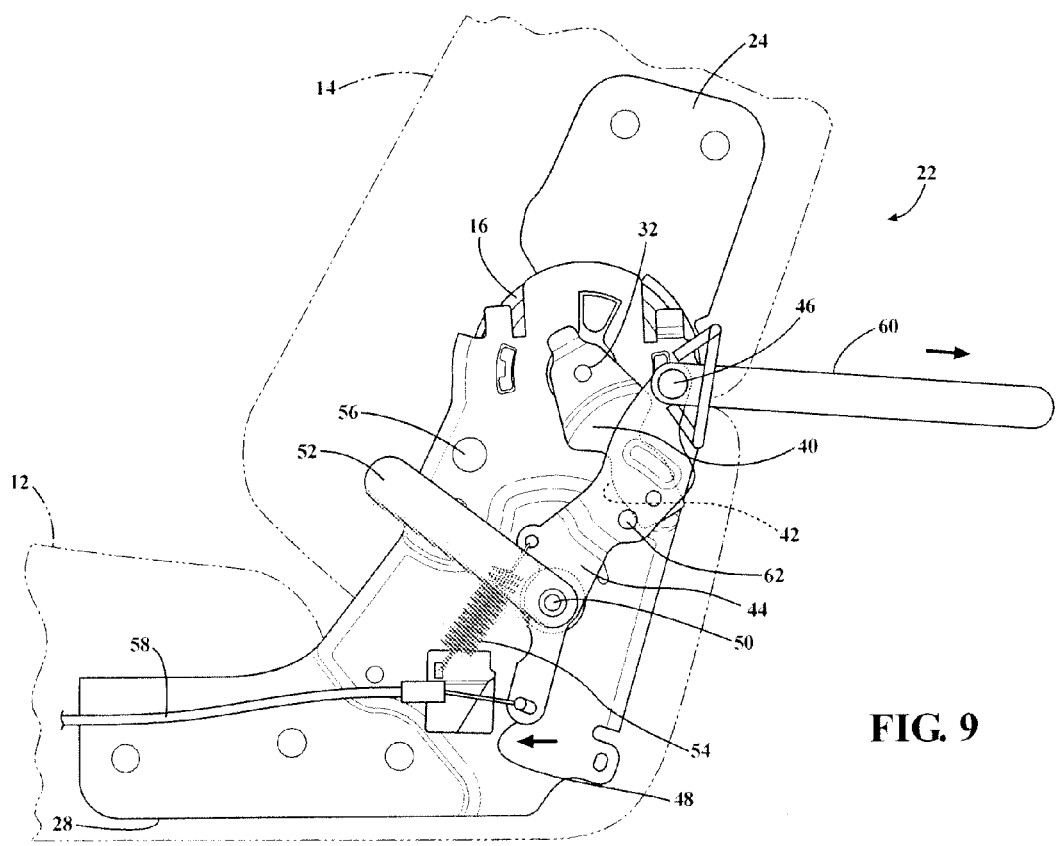
FIG. 9 is an outboard side view of the fold and tumble release mechanism with the recliner handle lever in a second actuated position unlocking the floor latch mechanism.
Figure 10:
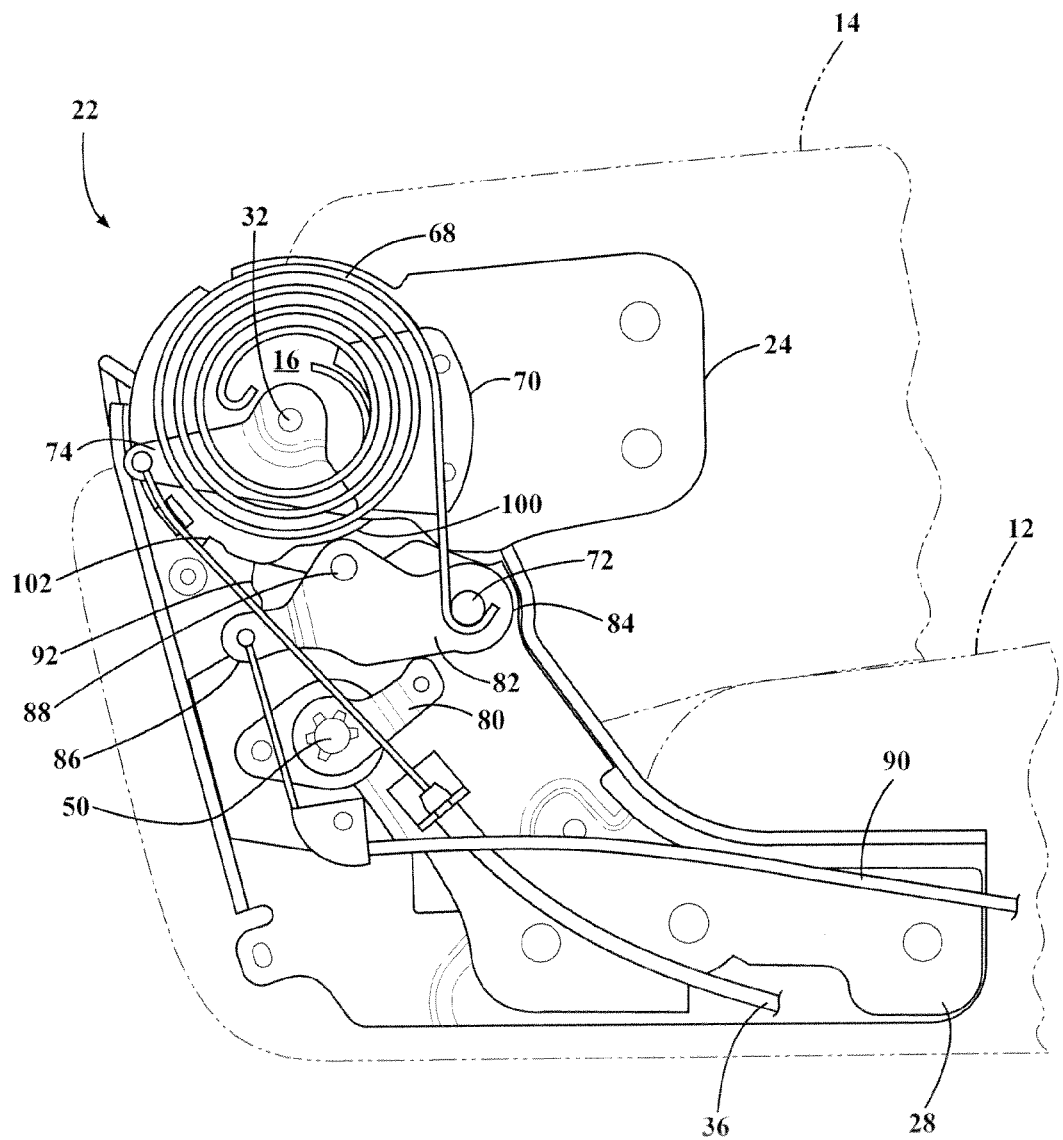
FIG. 10 is an inboard side view of the fold and tumble release mechanism with the recliner handle lever in the second actuated position.

Referring to FIGS. 9 and 10, as the recliner handle lever 44 is pivoted further clockwise to a second actuated position of approximately 45 degrees, the pin 62 continues to follow along the cam surface 42 of the recliner cam lever 40, however, at a slower rate caused by a change in curvature of the cam surface 42 to continue to open the recliner 16 at a slower rate to the unlocked condition. Actuation of the recliner handle lever 44 to the second actuated position further pivots the inboard cam lever 80 in the counterclockwise direction to rotate the floor latch release lever 82 in the clockwise direction about pivot post 72 to pull on the floor latch release cable 90 and release the floor latch mechanism 20. The inboard cam lever 80 also rotates the latch interlock lever 92 clockwise, or upwardly, into the notch 100 of the seat back bracket 24 and adjacent the end wall 102. Once the floor latch mechanism 20 is unlatched from the floor, the latch interlock lever 92 abuts the end wall 102 form by the notch 100 in the seat back bracket 24 to prevent the seat back 14 from being returned to the upright seating position while the seat is unlatched from the floor.

With the recliner cam lever 40 in the second actuated position, the seat assembly 10 is unlatched and free to pivot about the front pivot risers 18 from the fold flat position to the forwardly tumbled position as is commonly known in the art.

When the seat assembly 10 is returned from the tumbled position to the seating position, the floor latch mechanism 20 is latched and pulls on the floor latch release cable 90. The floor latch release cable 90 pulls on the floor latch release lever 82 and latch interlock lever 92 in the counterclockwise direction out of the notch 100 and allows the recliner handle lever 44 to return from the second actuated position to the first actuated position by the return coil spring 54. The seat back 14 may now be returned from the fold flat position to the seating position and the recliner handle lever 44 returned from the first actuated position to the neutral position to actuate the recliner 16 to the locked condition.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat assembly for use in an automotive vehicle, said seat assembly comprising:
a seat cushion adapted to be releasably and pivotally coupled to the floor of the vehicle for selective pivotal movement between a generally horizontal seating position and an upright tumbled position;
a seat back pivotally coupled to said seat cushion by a recliner mechanism for pivotal movement between an upright seating position and a fold flat position overlying said seat cushion; and
a release mechanism for selectively actuating said recliner mechanism between a locked condition and an unlocked condition allowing pivotal movement of said seat back between said seating and fold flat positions, said release mechanism including:
a recliner cam lever operatively coupled to said recliner mechanism for actuating said recliner mechanism between said locked and unlocked conditions, and a recliner handle lever pivotally coupled to said seat cushion and engaging said recliner cam lever in a first actuated position to actuate said recliner mechanism between said locked and unlocked conditions and allow pivotal movement of said seat back between said seating position and said fold flat position and further engaging said recliner cam lever in a second actuated position to release said seat cushion from the floor and allow pivotal movement of said seat cushion between said seating position and said tumbled position when said seat back is maintained in said fold flat position; and
wherein said recliner cam lever includes a cam surface and said recliner handle lever includes a cam follower pin for engaging said cam surface in said first and second actuated positions to actuate said recliner mechanism between said locked and unlocked conditions.

2. A seat assembly as set forth in claim 1 wherein said release mechanism includes a return coil spring coupled between said seat cushion and said recliner handle lever for biasing said recliner handle lever to a neutral position disengaged from said recliner cam lever.

3. A seat assembly as set forth in claim 2 wherein said release mechanism includes a floor latch release lever pivotally coupled to said seat cushion and selectively engaged with said seat back in said upright seating position to prevent release of said seat cushion from the vehicle floor.

4. A seat assembly as set forth in claim 3 wherein said release mechanism includes a cam lever connected to said recliner handle lever for engaging said floor latch release lever and releasing said seat cushion from the vehicle floor when said seat back is in said fold flat position to allow pivotal movement of said seat cushion to said tumbled position.

5. A seat assembly as set forth in claim 4 wherein said release mechanism includes a shaft rotatably coupled to said seat cushion and fixedly interconnecting said recliner handle lever and said cam lever.

6. A seat assembly as set forth in claim 5 wherein said release mechanism includes a latch interlock lever pivotally coupled to said seat cushion for selectively engaging said seat back in said fold flat position to prevent pivotal movement of said seat back to said seating position when said seat cushion is release from the vehicle floor.

7. A seat assembly as set forth in claim 6 wherein said seat cushion includes a seat cushion bracket and said seat back includes a seat back bracket, said recliner mechanism operatively coupled between said seat cushion bracket and seat back bracket to allow selectively pivotal movement of said seat back between said seating and fold flat positions when said recliner mechanism is in said unlocked condition.

8. A seat assembly as set forth in claim 7 wherein said release mechanism includes a pivot post fixed to said seat cushion bracket for pivotally supporting said floor latch release lever and said latch interlock lever.

9. A seat assembly as set forth in claim 8 wherein said floor latch release lever includes a blocking pin for engaging said seat back bracket when said seat back is in said seating position to prevent pivotal movement of said seat cushion to said tumbled position.

10. A seat assembly as set forth in claim 9 wherein said seat back bracket includes a notch terminating in an end wall for allowing actuation of said floor latch release lever when said seat back is in said fold flat position to release said seat cushion from the vehicle floor.

11. A seat assembly as set forth in claim 10 further including a clock spring coupled between said seat back bracket and said pivot post for biasing said seat back to said upright seating position.

* * * * *